(12) United States Patent
Nathanson (10) Patent No.: US 10,773,504 B2
(45) Date of Patent: Sep. 15, 2020

(54) SYSTEMS AND METHODS FOR MANUFACTURING BATTERY CELLS

(71) Applicant: Apple Inc., Cupertino, CA (US)

(72) Inventor: Scott M. Nathanson, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 141 days.

(21) Appl. No.: 16/145,448

(22) Filed: Sep. 28, 2018

(65) Prior Publication Data
US 2019/0389193 A1 Dec. 26, 2019

Related U.S. Application Data

(60) Provisional application No. 62/688,538, filed on Jun. 22, 2018.

(51) Int. Cl.
*B32B 37/02* (2006.01)
*B32B 37/00* (2006.01)

(52) U.S. Cl.
CPC .......... *B32B 37/02* (2013.01); *B32B 37/0053* (2013.01)

(58) Field of Classification Search
None
See application file for complete search history.

(56) References Cited

U.S. PATENT DOCUMENTS

| | | | | |
|---|---|---|---|---|
| 2,951,324 A | * | 9/1960 | Podlesak et al. | ... B29C 65/7894 53/511 |
| 5,685,131 A | * | 11/1997 | Spatolisano | ............ B29C 65/18 53/550 |
| 2004/0045261 A1 | * | 3/2004 | Sperry | .................... B65B 49/06 53/436 |
| 2006/0218881 A1 | * | 10/2006 | Sperry | .................... B65B 35/10 53/411 |

* cited by examiner

*Primary Examiner* — Jeffry H Aftergut
(74) *Attorney, Agent, or Firm* — Kilpatrick Townsend and Stockton LLP (57) ABSTRACT

Methods of laminating a multilayer substrate may utilize particular lamination systems to perform the methods. The methods may include providing the multilayer substrate, which may include a base, in a feed direction through a laminating system. The base may support segments of a material, each segment characterized by a height past the base in a direction normal to the feed direction. Each segment may define a leading edge at an intersection of a second surface and a third surface, and the segments may be separated from one another along the base by a spacing length. The methods may include contacting a first segment with a set of pinch rollers. The contacting may limit interaction with the third surface at the leading edge of the first segment. The methods may include compressing the first segment against the base in a direction normal to the feed direction.

13 Claims, 6 Drawing Sheets

SYSTEMS AND METHODS FOR MANUFACTURING BATTERY CELLS

CROSS-REFERENCE TO RELATED APPLICATIONS

This application claims the benefit of U.S. Provisional Application No. 62/688,538, filed Jun. 22, 2018, entitled "SYSTEMS AND METHODS FOR MANUFACTURING BATTERY CELLS", and which is hereby incorporated by reference in its entirety for all purposes.

TECHNICAL FIELD

The present technology relates to roller manufacturing. More specifically, the present technology relates to systems and methods for producing battery cells in roller manufacturing.

BACKGROUND

Roller manufacturing, such as using nip or pinch rollers, may be performed to compress or laminate materials together. When materials have different height profiles, roller impact at the intersection of protruding materials with a base having a different height profile may cause leading edge damage on the protruding components. Improved systems are needed.

SUMMARY

Methods of laminating a multilayer substrate may utilize particular lamination systems to perform the methods. The methods may include providing the multilayer substrate, which may include a base, in a feed direction through a laminating system. The base may support segments of a material, each segment characterized by a height past the base in a direction normal to the feed direction, each segment characterized by a first surface in contact with the base, a second surface opposite the first surface, and a third surface extending between the first surface and the second surface at a front of each segment in the feed direction. Each segment may define a leading edge at an intersection of the second surface and the third surface, and the segments may be separated from one another along the base by a spacing length. The methods may include contacting a first segment with a set of pinch rollers. The contacting may limit interaction with the third surface of the first segment at the leading edge of the first segment. The methods may also include compressing the first segment against the base in a direction normal to the feed direction.

In some embodiments, the set of pinch rollers may include two pinch rollers, with each pinch roller being rotatable in the feed direction at a position adjacent the multilayer substrate. The two pinch rollers may be separated by a gap distance defined at a contact position with the multilayer substrate at a location within the spacing length between two segments of the material and at a minimum separation between the two pinch rollers during revolution within the spacing length. The gap distance may be substantially equal to a thickness of the multilayer substrate through a segment location less a compression distance. A diameter of the pinch rollers may produce a tangent angle of less than 90°. One of the two pinch rollers may be coupled with a lifter configured to increase the gap distance proximate each segment to a gap distance substantially equal to a thickness of the multilayer substrate through a segment location less a compression distance.

At least one pinch roller of the two pinch rollers may define a section along a cross-sectional perimeter of the pinch roller characterized by a substantially linear or concave profile.

The at least one pinch roller of the two pinch rollers may be characterized by a constant radius along the remaining perimeter of the pinch roller. The at least one pinch roller may define a plurality of the sections along the cross-sectional perimeter. The at least one pinch roller may be characterized by a constant radius between each section of the plurality of the sections, and a distance along the cross-sectional perimeter between each section may be greater than a length of each segment of the material. Each of the two pinch rollers may define a section along a cross-sectional perimeter of the pinch roller characterized by a substantially linear or concave profile. The section on a first pinch roller of the two pinch rollers may be characterized by a greater length than the section on a second pinch roller of the two pinch rollers. Each pinch roller may be or include steel.

Some embodiments of the present technology may also encompass laminating systems. The systems may include a set of pinch rollers, and the set of pinch rollers may include two pinch rollers. Each pinch roller may be rotatable in a feed direction of a substrate at a position adjacent the substrate. The two pinch rollers may be separated by a gap distance defined at a contact position with the substrate at a location within a spacing length between two segments of a material supported on the substrate and at a minimum separation between the two pinch rollers during revolution within the spacing length. The gap distance may be substantially equal to a thickness of the substrate through a segment location less a compression distance. A diameter of the pinch rollers may produce a tangent angle of less than 90°. One of the two pinch rollers may be coupled with a lifter configured to increase the gap distance proximate each segment to a gap distance substantially equal to a thickness of the substrate through a segment location less a compression distance. At least one pinch roller of the two pinch rollers may define a section along a cross-sectional perimeter of the pinch roller characterized by a substantially linear or concave profile. The at least one pinch roller of the two pinch rollers may be characterized by a constant radius along the remaining perimeter of the pinch roller. The at least one pinch roller may define a plurality of the sections along the cross-sectional perimeter. The at least one pinch roller may be characterized by a constant radius between each section of the plurality of the sections, and a distance along the cross-sectional perimeter between each section may be greater than a length of each segment of the material supported on the substrate.

Some embodiments of the present technology may also encompass methods of laminating a multilayer substrate. The methods may include providing the multilayer substrate, which may include a base, in a feed direction through a laminating system. The base may support segments of material, each segment characterized by a height past the base in a direction normal to the feed direction, each segment characterized by a first surface in contact with the base, a second surface opposite the first surface, and a third surface extending between the first surface and the second surface at a front of each segment in the feed direction. Each segment may define a leading edge at an intersection of the second surface and the third surface, and the segments may be separated from one another along the base by a spacing length. The methods may include contacting a first segment with a set of pinch rollers. The contacting may limit interaction with the third surface of the first segment at the leading edge of the first segment. At least one pinch roller of the set of pinch rollers may define a section along a cross-sectional perimeter of the pinch roller characterized by a substantially linear or concave profile. One pinch roller of the set of pinch rollers may be characterized by a larger diameter than another pinch roller of the set of pinch rollers, the larger diameter of the pinch roller configured to produce a tangent angle of less than 90°. The methods may also include compressing the first segment against the base in a direction normal to the feed direction.

The present technology may provide numerous benefits over conventional technology. For example, embodiments of the present technology may improve roller manufacturing to limit an impact on leading edges of materials to be compressed. Additionally, the described methods may produce improved battery cells and other devices that may include brittle materials that can be damaged by roller impact. These and other embodiments, along with many of their advantages and features, are described in more detail in conjunction with the below description and accompanying figures.

BRIEF DESCRIPTION OF THE DRAWINGS

A further understanding of the nature and advantages of the disclosed embodiments may be realized by reference to the remaining portions of the specification and the drawings.

Several of the figures are included as schematics. It is to be understood that the figures are for illustrative purposes, and are not to be considered of scale unless specifically stated to be of scale. Additionally, as schematics, the figures are provided to aid comprehension and may not include all aspects or information compared to realistic representations, and may include exaggerated material for illustrative purposes.

In the figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION

Manufacturing operations that include roll-to-roll processes, or other roller-based operations may be prone to issues related to impact damage. In one non-limiting example, battery cells may be formed in a roller process. A web of a separator or current collector may have segments of anode and/or cathode active material positioned on the web. The web may be fed towards pinch rollers, which may compress the active material into the web. The compression may couple the materials, or may activate an adhesive positioned between the two materials via heat, pressure, or some combination of the two. The active materials may be positioned on the web in a spaced configuration, which may include gaps between each section of active material. Due to these gaps, a height differential may be formed where the rollers may rise at each section of active material to perform the compression.

When the roller contacts a section of active material, the roller may impact the front section of the active material, and effectively climb the front sidewall before rolling along a top surface and compressing the material. This process, which may occur in these exemplary battery cells as well as any other roller process, may cause impact damage at the leading edges of the materials to be compressed. Depending on the properties of the material being compressed, this impact may cause damage at the leading edge, which may flake or dislodge particulates of the materials being compressed. Returning to the exemplary battery cell process, leading edge impact damage has been shown to cause short circuits and yield loss in some designs. At impact, active material particulates may be dislodged and repositioned. These particulates may create points of friction or may pierce the separator on which the active materials reside. This may allow short-circuiting to occur, which may cause performance issues, and in some circumstances may spoil the cell.

Conventional technologies have generally accepted an amount of yield loss due to these processes and the effects of leading edge impact damage. The present technology, however, overcomes these issues by performing manufacturing processes adapted to accommodate the materials being worked. By adjusting one or more aspects of the manufacturing processes, leading edge damage may be reduced or eliminated. Accordingly, the present technology may produce materials at a lower yield loss due to leading edge impact effects. Although the remaining disclosure will regularly discuss battery cells and components being formed by the systems and methods of embodiments of the present technology, it is to be understood that the systems and methods discussed may be applicable to any roller-based manufacturing process. After discussing components of an exemplary battery cell that may be at least partially produced with some aspects of the present technology, the description will include a variety of components and systems according to embodiments of the present technology.

Figure 1:
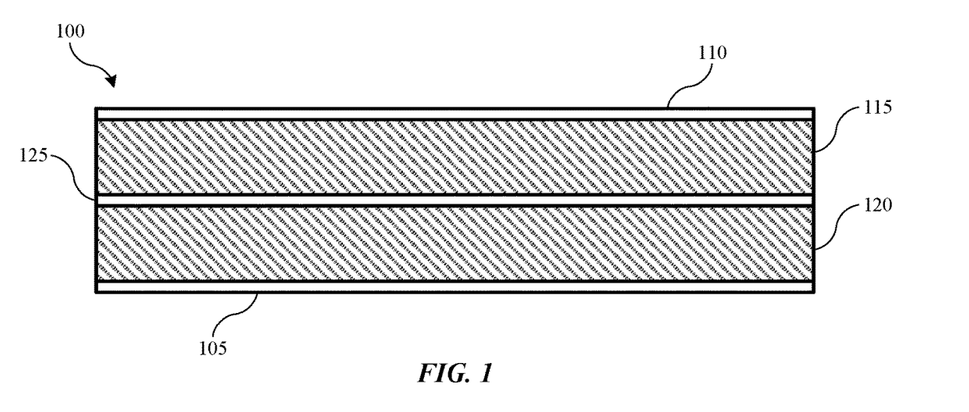
FIG. 1 shows a schematic view of layers of an energy storage device according to some embodiments of the present technology.

FIG. 1 shows a cross-sectional view of an exemplary energy storage device 100, which may be developed with systems according to some embodiments of the present technology. Energy storage device 100 may be a battery, a battery cell, or some other energy storage device in embodiments. Exemplary energy storage device 100 includes a first current collector 105 and a second current collector 110, one of which may be the anode, and the other the cathode side of the energy storage device. Current collectors 105 and 110 may be made of any known collector materials, such as aluminum, copper, nickel, stainless steel, or a variety of other materials that may be capable of operating at cathode and anode potentials within the cell environment.

Energy storage device 100 includes electrode active material 115 disposed on current collector 110, and electrode active material 120 disposed on current collector 105. Again, either of electrode active materials 115, 120 may be the anode or cathode materials in exemplary designs. In some examples, electrode active material 115 is an anode material and includes a carbon-containing compound such as graphite or a lithium-containing compound such as lithium titanate. Any other anode materials may similarly be used with the present technology. Additionally, for example, electrode active material 120 is a cathode material including a lithium-containing material such as lithium cobalt oxide or lithium phosphate, among other known lithium compounds used in such devices. The electrode active material 120 may also include nickel, manganese, cobalt, aluminum, and a variety of other materials that would be understood to be encompassed by the present technology. Indeed, any possible anode and cathode materials that may be utilized in batteries including separators are suitable for the present systems, and will be understood to be encompassed by the present technology.

Separator 125 is disposed between the electrode active materials 115, 120, and may include a variety of materials that allows lithium ions to pass through the separator structure while not otherwise conducting electricity. In some embodiments, separator 125 may be a polymer film. Energy storage device 100 is included to illustrate certain components that may be included in whole or in part in devices formed according to some embodiments of the present technology. For example, other exemplary devices may include fewer layers, or different layers including pouch or lamination layers formed about one or more of the layers noted.

Figure 2:
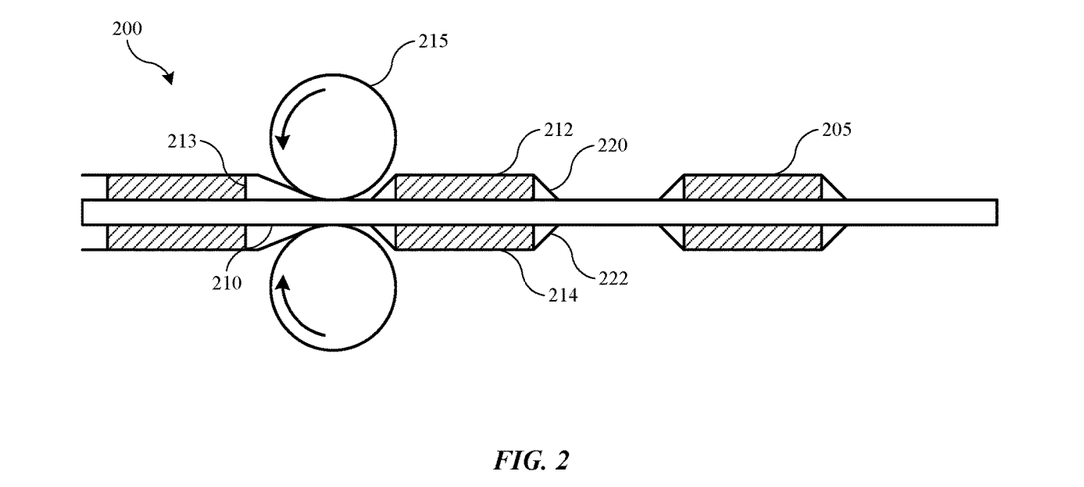
FIG. 2 shows a schematic view of an exemplary fabrication process according to some embodiments of the present technology.

FIG. 2 shows a simplified schematic view of components of a fabrication system 200 for producing manufactured items, which may include battery cells, such as cells described above. The fabrication process may be performed as a roll-to-roll process, and may be performed from windings of battery cell components that may be further processed in later fabrication operations, including additional roller processes, as well as dicing, stacking, or other formation operations. Fabrication system 200 may be a mid-line process performed on a substrate of pre-formed materials, such as electrode active materials previously disposed on a current collector, as well as over a polymeric film that may constitute part of a battery separator, for example, and also over a carrier film as previously described. The substrate may be provided directly from a previous operation, such as deposition of electrode active materials on a current collector or separator, or a roll of polymeric material or electrode active material on a current collector or separator may be unspooled into fabrication system 200. Similarly, subsequent processing, the substrate may be wound into a spool for later processing, or may be delivered to additional equipment to be further processed. In some embodiments, the material formed by fabrication system 200 may be directly used in wound cell applications, or diced for stacked cell configurations, depending on the manufacturing process being performed.

In an exemplary process fabricating battery cells as noted above, fabrication system 200 may deliver a substrate 205 to a set of rollers 215, or some other apparatus for moving the substrate through the fabrication process 200. Substrate 205 may include a separator 210 on which an electrode active material may be disposed. In some embodiments the substrate may include a current collector having electrode active material as well. The electrode active material may be disposed on one or two opposing surfaces of the separator. As illustrated, electrode active materials 212, 214 are formed over separator 210, and delivered into the fabrication system. For example, separator 210, which may be a polymeric material, and which may or may not include an adhesive on either surface, may be unspooled and discreet segments of active material may be deposited on the separator.

As discussed previously, the electrode active materials 212, 214 may be either anode active materials or cathode active materials in different embodiments. Fabrication system 200 may also include apparatus for depositing a lamination film 220 over the electrode active material 212, as well as a lamination film 222 on electrode active material 214 when formed on opposite sides of the substrate 205. The lamination films may also be polymeric materials, and may form seals about the cell materials. Depending on the cell configuration, more or less layers of materials may be included. For example, in some configurations an additional separator may be positioned between an outer lamination film and an anode active material, or current collectors may be incorporated within the stack of materials. Additionally, multiple cell electrodes may be disposed between lamination films. The active material sections may be applied or deposited in any number of ways including by gravure coating, slot die coating, doctor blade coating, or other coating techniques that may provide a complete and uniform coverage across the electrode active materials 212, 214. For example, the sections of active material may be laser cut and deposited, and sensors may be used within the system to ensure identical or substantially identical spacing between active material segments.

As illustrated, substrate 205 may be a multilayer substrate, and may have height differences between sections including active materials and sections with no active materials.

This height difference may operate to form a step to be accommodated by the rollers 215. The rollers may each rotate in the feed direction proximate the substrate, and may accordingly rotate in a direction opposite from one another as illustrated. The rollers may be separated from one another by a gap, which may be set to accommodate the substrate under an amount of pressure. The gap may be at a position where a distance between outer surfaces of the two rollers may be at a minimum, such as at a zenith or nadir of the two opposing rollers.

As the rollers proceed towards each section of active material, one or both rollers may translate vertically to accommodate the increase in gap height. However, at a leading edge of the active material, such as leading edge 213 illustrated, an impact may occur, where the roller may effectively climb the height of the active material before proceeding with the lamination operation at the increased height. Depending on the materials being processed, and the characteristics of the rollers, this impact may affect and dislodge active material at the leading edge of the active material. Particulate material may transfer onto the separator, and during lamination or subsequent processing may pierce the layer and/or cause shorting in some scenarios. Accordingly, aspects of the present technology may adjust either the lamination process, or components of the fabrication system, to limit or prevent leading edge damage, while still performing a compression of the material to afford complete coupling or sealing of the active material with the separator.

Figure 3:
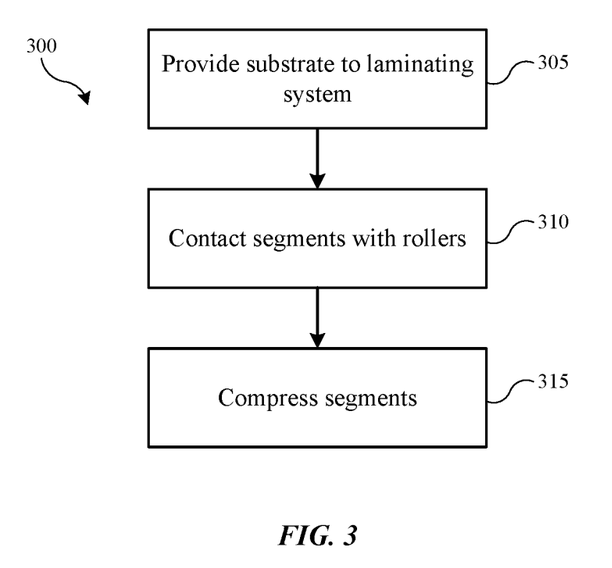
FIG. 3 shows exemplary operations of a method of laminating a multilayer substrate according to some embodiments of the present technology.

The present technology may utilize improved manufacturing techniques allowing the formation of laminated materials with limited or reduced leading edge damage. FIG. 3 identifies selected operations in a method 300 of laminating a multilayer substrate. The method may be used in forming any number of materials or devices including battery cells. The following figures will identify a number of variations affording reduced or limited leading edge damage processes based on examples of producing battery cell laminates. It is to be understood that the technology is not limited to battery cells.

Method 300 may include providing a substrate to a laminating system at operation 305. The substrate may include a multilayer substrate, or include materials having height differentials along the substrate, or by the disposition of materials across a base, and that may be contacted by rollers or other compression devices. The substrate may be delivered in a feed direction through the laminating system. The substrate may be delivered along runners, or may be fed through multiple rollers as noted above. The substrate may include a base, which may be a web base, and may include any number of carrier materials as well as device structures. In one example, a polymeric material, which may be a separator for a battery cell, may be fed by one or more rollers or other delivery mechanisms through a lamination system. The web base may support segments of a material, which may be an active material. The active material may be disposed on one or two opposite surfaces of the web.

Each segment of material may be characterized by a height that extends above, below, or past the web base in a direction normal to the direction of feed. The segments of material may include a first surface in contact with the base, a second surface opposite the first surface, and sidewall surfaces, such as third and fourth surfaces. For example, the third surface may extend between the first surface and the second surface at a front of each segment in the feed direction, and the fourth surface may extend between the first surface and the second surface at a back of each segment in the feed direction. Each segment may define a leading edge at an intersection of the second surface and the third surface. Each segment may be separated from each other segment along the base by a spacing length. The spacing length may vary based on the materials being produced. For example, smaller segments of material may be spaced closer together than larger segments of material, or the opposite may be performed. The spacing may provide an amount of height differential between segments of material on the base.

At operation 310, a first segment of material on the web base may be contacted by the rollers, which may include a single roller or a set of rollers in some embodiments. The rollers may be in a stacked configuration to perform operations on opposing surfaces of the substrate, or may be inline of each other to perform multiple pass laminations, such as on a substrate transported on a carrier line or belt, for example. The roller or rollers may be configured to perform a lamination operation or a compression operation of the segments of material against the base or carrier. For example, the rollers may be configured to couple the segments with the base, and which may activate an adhesive, such as with heat and/or compressive pressure, which may allow the coupling along the first surface of the segments. The contacting operation may be performed to limit or reduce contact between the rollers and the third surface of the segment of material, and may reduce contact at the leading edge of the first segment. The rollers may compress the second surface of the segments of material and may laminate two or more layers of material together at operation 315. The compression may occur in a direction normal to the feed direction of the substrate.

The present technology may perform the contacting and compression in a variety of ways to reduce or limit leading edge damage and/or contact with a front face, such as a third surface of the segments of material to be laminated or compressed. The remaining figures will illustrate a variety of processing arrangements to perform one or more of the operations of method 300.

Figure 4:
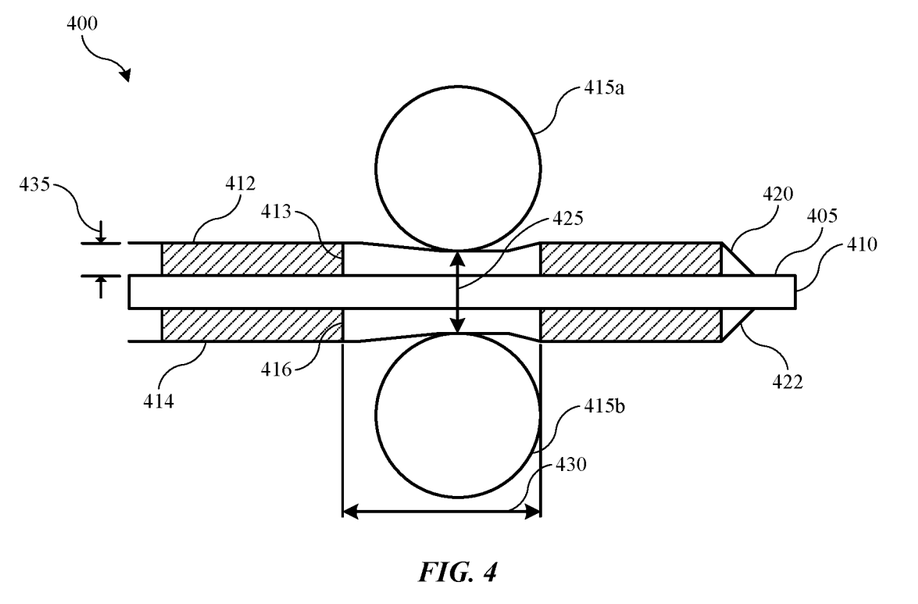
FIG. 4 shows a schematic view of an exemplary lamination system according to some embodiments of the present technology.

FIG. 4 shows a schematic view of an exemplary lamination system 400 according to some embodiments of the present technology. The system shows an exemplary set of rollers, which may be used to perform operations of method 300 described above. The system is illustrated performing operations for a battery cell fabrication, although it is to be understood that the system may be adapted for or utilized in any other lamination or compression system. System 400 illustrates a set of rollers including two pinch rollers 415a and 415b, with each pinch roller being rotatable in a feed direction of a substrate being processed, such as a multilayer substrate as previously described. System 400 may include any components of system 200 previously described, including a number of components, both upstream and downstream, for performing additional operations. The system may also include any number of ancillary equipment facilitating operation of the system to perform the operations described.

The pinch rollers 415 may be separated by a gap 425. Gap 425 may be a distance maintained between the two rollers at a given position during operation. For example, gap 425 may be defined by two or more characteristics of the system. The gap 425 may be at least partially defined at a contact position with a substrate 405, such as a multilayer substrate. The multilayer substrate may include one, two, or more materials, including a base, such as a polymeric web 410, and segments of material, such as active materials 412, 414. The segments of active material may be separated from one another by a spacing length 430 between subsequent segments of material.

The gap 425 may be defined at a contact position with substrate 405 at a location within the spacing length 430 between two segments of the material. The gap may also be defined at a minimum separation distance between the two pinch rollers during revolution within the spacing length. For example, the separation distance may be a distance from a nadir of roller 415a and a zenith of roller 415b, which may also define contact points with substrate 405. The separation distance may also be defined at least partially by the profile of one or both of the rollers, which will be described in more detail below. For exemplary setups incorporating substantially circular cross-sectional profiles, the separation distance may be constant or substantially constant within the spacing length 430 at all positions during rotation. An exemplary substrate may additionally include a first lamination film 420 and a second lamination film 422, which may be materials as described above, and may be the materials that may be in direct contact with the rollers 415, although systems may not include lamination films as well, and the rollers may directly contact the segments of material 412, 414 and/or the base 410 in embodiments.

System 400 illustrates a roller setup that maintains a gap distance that may be based or substantially based on a compression distance for materials defining the largest cross-sectional length along the substrate. For example, a first cross-sectional length may be defined within the spacing length between segments, and this first cross-sectional length may be less than a second cross-sectional length defined through one or more segments of the materials 412, 414. Rollers 415 may maintain a gap distance that is substantially equal to the second cross-sectional length, or a cross-sectional length through one or more segments of materials 412, 414 to be compressed or laminated in system 400. The gap distance may be less than the cross-sectional length, to accommodate an amount of compression, or a compression distance to be performed by the rollers.

The compression distance may be based on the materials being laminated or processed.

For example, thin films of materials 412, 414, such as of micron thicknesses or less, may be compressed less than films of materials having thicknesses of several centimeters or more. The compression distance may be based on a pre-compression height 435 of the material to be compressed prior to contacting the rollers 415. The compression distance may be a percentage of the height, for example, or a discreet distance, such as less than or about one centimeter, less than or about one millimeter, or less than or about one micrometer. The compression distance may be less than or about 50% of the pre-compression height 435, for example, which may be defined as a post-compression height that is half of the pre-compression height. This height difference may define the gap distance for rollers 415, which may be equal to or about the post-compression height. In some embodiments, the compression distance may be less than or about 40% of the pre-compression height, less than or about 30% of the pre-compression height, less than or about 20% of the pre-compression height, less than or about 10% of the pre-compression height, less than or about 5% of the pre-compression height, less than or about 1% of the pre-compression height, or less. The compression distance may determine an amount of contact with the leading edges 413, 416 of the materials being laminated. The greater the compression distance, the more contact may occur at the leading edge, which may increase the impact and damaging forces on the materials 412, 414. Accordingly, in some embodiments, by reducing the compression distance, leading edge damage may be reduced. However, in many manufacturing operations, compression height may be a set distance, which may allow limited reduction. Accordingly, in such manufacturing systems, additional modifications may be made as discussed further below.

Rollers 415 may be or include any number of materials or components. For example, rollers 415 may be or include steel, rubber or rubber-coated materials, plastics including fluoropolymers or fluoroelastomers, as well as any other known materials that may accommodate physical and/or chemical properties of the materials to be compressed. The rollers may have a defined compressive force, which may be based at least in part on the weight of the rollers or the driving system. The rollers may be cylindrical in some embodiments, although in some embodiments the rollers may be characterized by a bowed profile near a center along a longitudinal axis through the roller. Some rollers, such as plastic or rubber-based rollers, may show an amount of deformation from one longitudinal end to another, such as through a center. By increasing a diameter of the roller towards the center, such as along a gradient, the material properties producing deformation may be overcome to ensure a constant or uniform contact across the materials to be compressed.

Figure 5:
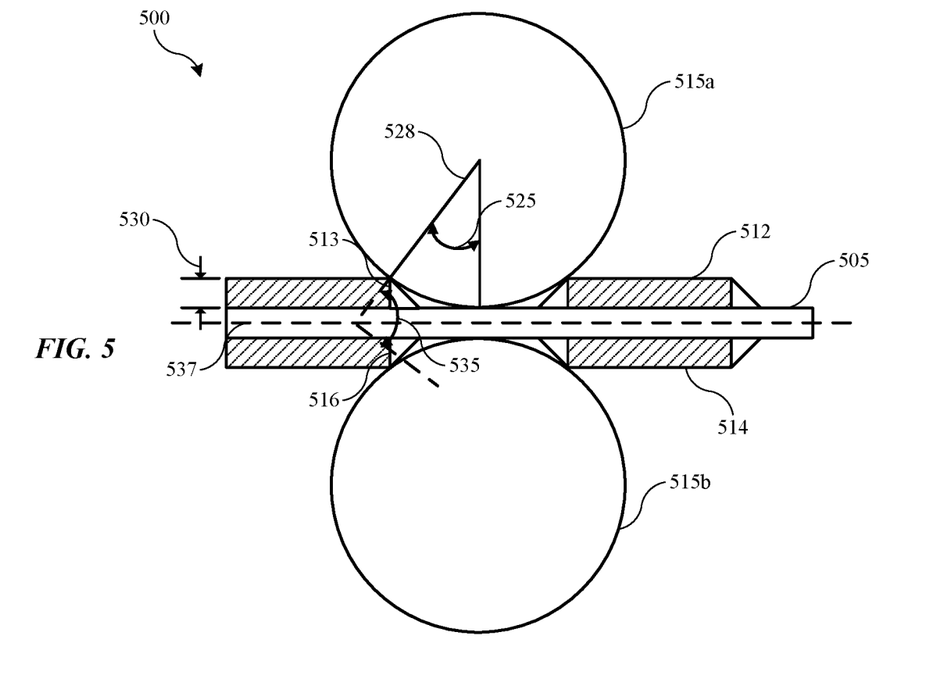
FIG. 5 shows a schematic view of an exemplary lamination system according to some embodiments of the present technology.

FIG. 5 shows a schematic view of an exemplary lamination system 500 according to some embodiments of the present technology. System 500 may include any of the components or characteristics of any of the previous systems, and may reduce leading edge damage on materials of a substrate being compressed within the system 500. System 500 is again illustrated as performing operations on a battery cell substrate 505, although it is to be understood that the system may be adapted to or utilized with any other manufacturing setup.

As illustrated, system 500 may include rollers 515 characterized by increased diameters relative to rollers of system 400, for example, although the systems may be combined in some embodiments to include aspects of each setup. The diameter of the rollers may be increased to further limit contact with a leading surface or edge of the materials to be compressed. For example, a contact angle 525 may be defined by the radius 528 of the rollers and the height 530 of the material 512, 514 to be compressed in examples where the roller essentially contacts the base within the spacing length. In examples such as illustrated in FIG. 4 where the roller height is raised, the height 530 may be equal to or approximate the compression length.

In one example as illustrated in FIG. 5, contact angle 525 may be characterized as the arccosine of the fraction defined by radius 528 minus height 530 divided by radius 528. The contact angle may define an amount of impact force produced by the roller upon contacting the material to be compressed. For example, the force in a direction along the radius 528 at the leading edge may include a compressive component occurring in a direction normal to the substrate, as well as a damaging force or impact force in a direction opposite the feed direction of the substrate. The compressive force may be predefined based on an amount of compression to be performed on the materials, and the material properties themselves. With the contact angle and the compressive force component defined, a damaging force may be calculated as the product of the compressive force and the value of the tangent of the contact angle. Substituting the contact angle calculation into the damaging force calculation illustrates how roller radius 528 and step height or height 530 of the material affects the damaging force. For example, by reducing the step height, either with material modification or adjusting the rollers such as in FIG. 4, damaging force may be reduced. In some embodiments incorporating features of both system 400 and system 500, the roller may be sized to span the entire spacing length between segments of material to be compressed, which may further reduce impact on the leading edge of individual segments. Additionally, by increasing the roller diameter as illustrated in FIG. 5, damaging force may be reduced.

The contact angle may further define a tangent angle 535. The tangent angle 535 may be an angle that may be double the angle between a vector, such as the contact force vector, extending along a radius of the pinch roller through a location of contact at the leading edges 513, 516 of the materials to be compressed, such as at an intersection of an upper surface of the material to be compressed and a front sidewall defining a height of the material, and a center line 537 of the substrate. As radius 528 increases, contact angle 525 may be reduced, and tangent angle 535 may be similarly reduced. As the tangent angle decreases, the amount of horizontal force decreases to further reduce or limit impact damage. Accordingly, in some embodiments, rollers utilized in systems may be characterized by a diameter to produce a tangent angle of less than or about 120°, and may be characterized by a diameter to produce a tangent angle of less than or about 110°, less than or about 100°, less than or about 90°, less than or about 80°, less than or about 70°, less than or about 60°, less than or about 50°, less than or about 40°, less than or about 30°, less than or about 25°, less than or about 20°, less than or about 15°, less than or about 10°, or less. The contact angle may also be associated with the relationship of the vertical compressive force and the horizontal damaging force. As compressive force exceeds damaging force, leading edge damage may be reduced. This crossover may occur in some embodiments as contact angle decreases to below or about 45°, where compressive force may substantially equal damaging force. This contact angle may correspond to a tangent angle of about 90°, and as the tangent angle continues to reduce below 90°, leading edge damage may be further minimized.

Figure 6:
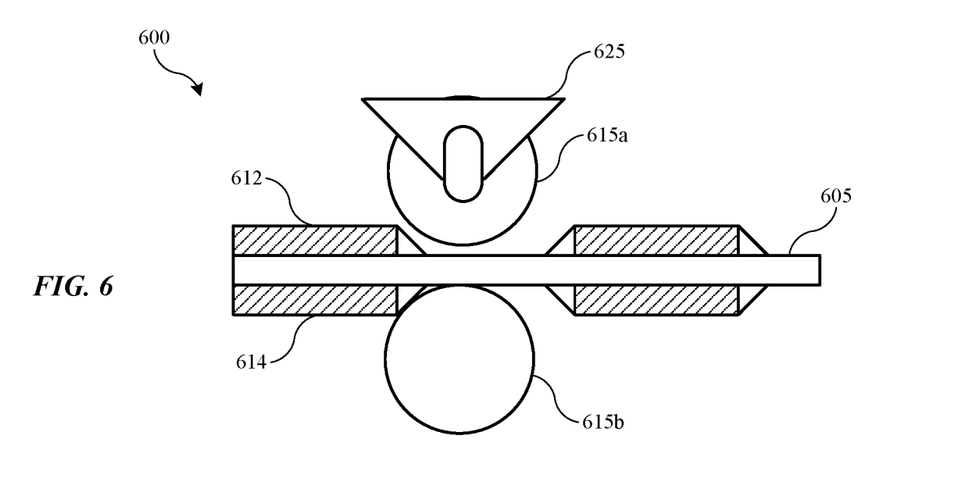
FIG. 6 shows a schematic view of an exemplary lamination system according to some embodiments of the present technology.

FIG. 6 shows a schematic view of an exemplary lamination system 600 according to some embodiments of the present technology. System 600 may include any of the components or characteristics of any of the previous systems, and may reduce leading edge damage on materials of a substrate being compressed within the system 600. System 600 is again illustrated as performing operations on a battery cell substrate, although it is to be understood that the system may be adapted to or utilized with any other manufacturing setup.

As illustrated, system 600 may include rollers 615a, 615b incorporated within a lifter 625, for example, although it is to be understood that aspects of any of the previous configurations may be incorporated with system 600 or combined in some embodiments to include aspects of each setup, which may further limit leading edge damage. Lifter 625 may be included with one or both rollers, or any number of rollers within the set of rollers, and may operate or be configured to operate to increase the gap distance between the rollers intermittently. For example, lifter 625 may increase the gap distance proximate each segment. As the substrate proceeds through system 600, rollers 615 within a spacing length may approach a leading edge of the material to be compressed. As the rollers 615 approach the material 612, 614, lifter 625 may engage to increase a gap distance by translating one or both rollers in a direction normal to the feed direction. The movement may separate the gap distance to be substantially equal to a thickness of the substrate 605 through a segment location less a compression distance as described above.

The system 400 described with reference to FIG. 4 may affect lamination aspects depending on the heights and thicknesses of the constituent components. For example, some manufacturing operations may require a lamination film to be fully compressed against either the base or the segments, and component thicknesses may not afford contact if the rollers are maintained at a compression distance at all times. Accordingly, system 600 may be utilized to produce complete contact with surfaces of differing cross-sectional heights along the substrate.

Lifter 625 may include a number of systems configured to raise the rollers, and may be modified in part based on the complexity of the substrate. For example, where uniform spacing lengths and segment lengths extend completely along the substrate, lifter 625 may be a cam that drives the roller 615 and is shaped to accommodate the increased height at each material segment. Lifter 625 may also be a mechanical or pneumatic operation that raises or lowers the roller based on an approaching height difference. For example, lifter 625 may include a sensor facing an incoming substrate, and which may react to a segment height difference and instruct the lifter to engage and raise the lifter 625 to a predetermined height, or to a height as identified by the sensor, which may incorporate a compression height adjustment to the sensed height in the provided instruction. Any other device or system that may increase and decrease a height of the rollers 615 may also be included to limit impact at a leading edge of the materials to be compressed.

Figure 7A:
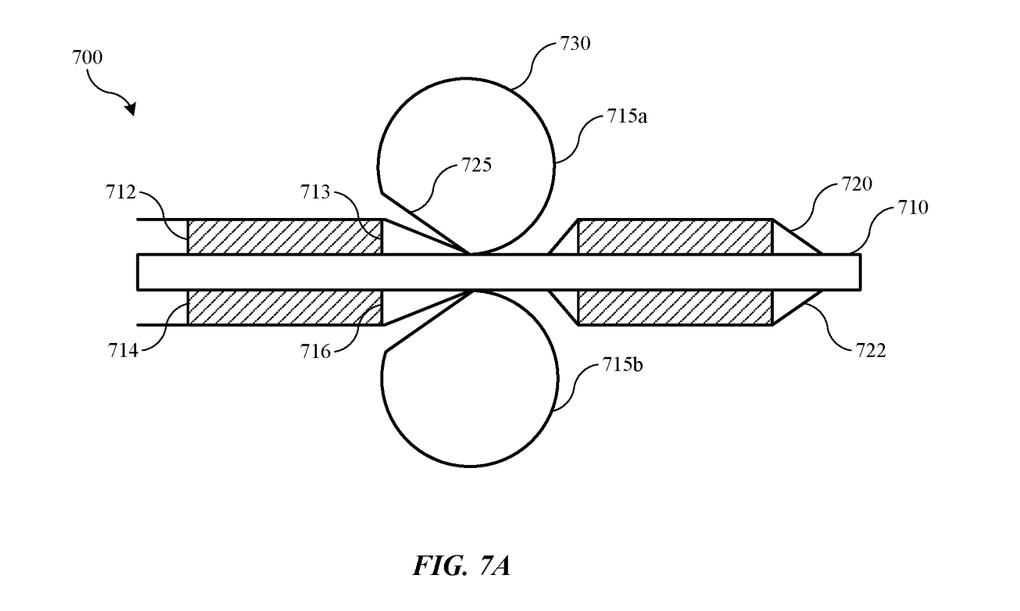
FIGS. 7A-7C show schematic views of a fabrication process utilizing an exemplary lamination system according to some embodiments of the present technology.
Figure 7B:
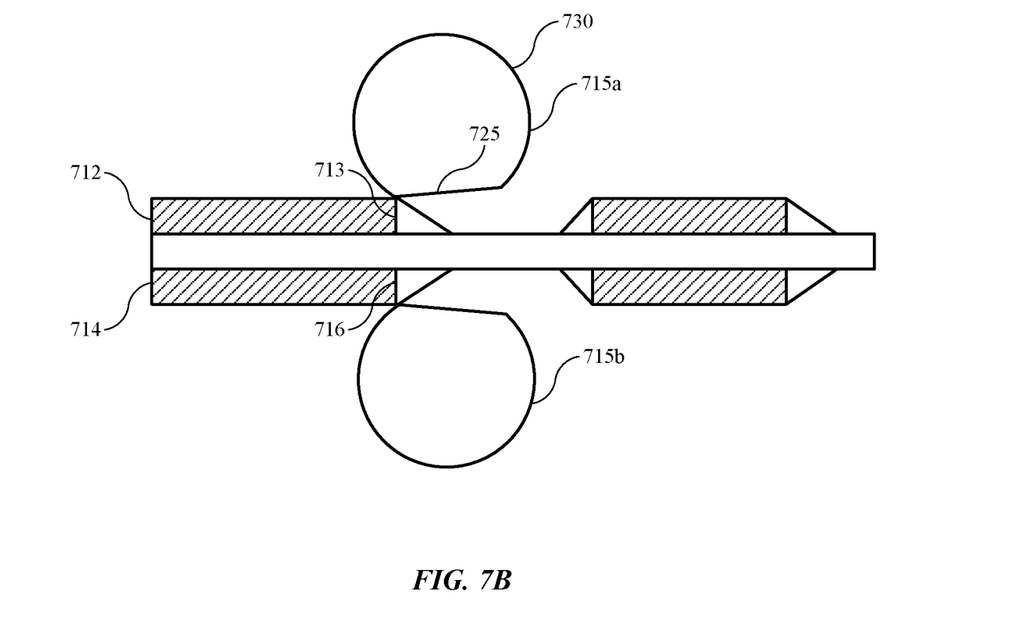
Figure 7C:
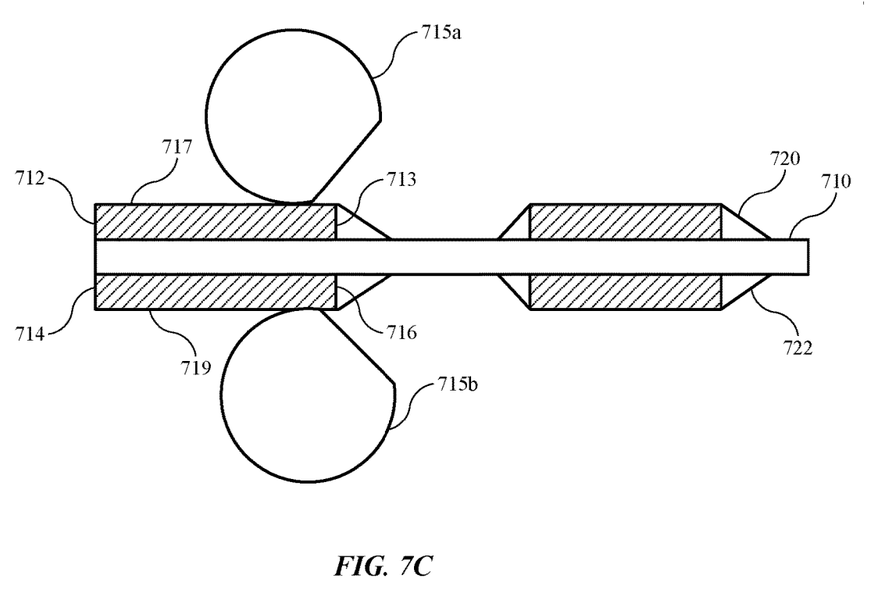

FIGS. 7A-7C show schematic views of a fabrication process utilizing an exemplary lamination system 700 according to some embodiments of the present technology. System 700 may include any of the components or characteristics of any of the previous systems, and may reduce leading edge damage on materials of a substrate being compressed within the system 700. System 700 is again illustrated as performing operations on a battery cell substrate, although it is to be understood that the system may be adapted to or utilized with any other manufacturing setup.

The calculations described above illustrate how compressive force, roller radius, and step height may all affect the damaging force. In many system setups many if not all of these variables are predefined by the system or product requirements. Consequently, adjusting these parameters may not be feasible, or may be limited such that damaging force may still cause an unsatisfactory amount of leading edge damage. In these and other circumstances, system 700 may reduce or limit leading edge damage further by utilizing a modified roller profile to accommodate a leading edge of the materials to be compressed.

System 700 includes rollers 715a, 715b that may include a modified profile. One or both rollers 715 may define a section 725 along a cross-sectional perimeter 730 of the pinch roller that may be characterized by a substantially linear or modified profile. For example, section 725 may define a flat surface, which may be characterized by a number of profiles discussed further below, but which may not include a convex shape, unlike the rest of the roller along perimeter 730. For example, the remainder of the perimeter 730, without section 725, may be characterized by a constant radius along the remaining distance about the roller.

Section 725 may be considered a synchronized flat incorporated about the roller, which may be spaced and configured to limit or eliminate contact of an impact nature at the leading edges 713, 716 of the materials to be compressed. For example, a convex portion of the roller, such as along perimeter 730 away from section 725, may allow the roller to have a reduced gap height to reduce the gap height to the thickness of the base of the substrate, which may allow contact of a laminating film 720, 722 with base 710. The rotation and position of the roller may be preset to extend a convex portion of the roller within this region as shown in FIG. 7A. The position of the rollers 715 may be such that section 725 extends towards the leading edge of the materials 712, 714, which may allow the roller to contact the leading edges 713, 716 with reduced horizontal impact, and in some embodiments with substantially or essentially no horizontal contact at the leading edges as shown in FIG. 7B.

By incorporating a synchronized flat, the contact of the roller at section 725 may be characterized by exclusively downward contact, depending on the length and placement of the flats and the rotation profile of the rollers. For example, in some embodiments profiles as described with respect to FIGS. 7A-7C may be incorporated with a system of system 400. The synchronized flat may be configured to span a spacing length between segments, and may maintain a height profile for the system to limit leading edge contact of an arcuate surface of the roller. Such a configuration may additionally support narrowing of the spacing length and section 725, which may increase yield for a given amount of substrate.

The specific profile of a roller may be a modified sine cam profile, which may not include complete linear profiles along section 725, and which may be calculated and produced based on characteristics of the substrate. Such a configuration may allow reduction up to complete elimination of leading edge contact for a variety of substrate configurations. As the roller continues a revolution, the remaining perimeter 730 may be characterized by a constant radius, which may afford a constant compression along a top or outermost surface 717, 719 as illustrated in FIG. 7C. FIGS. 7A-7C are illustrated as including flats on both of the rollers, although it is to be understood that in some embodiments only one roller may include a flat. Additionally, system 700 may further include any of the aspects of any of the previously described systems, which may allow further configuration of a system for laminating or compressing components, while limiting leading edge contact and/or damage.

Figure 8:
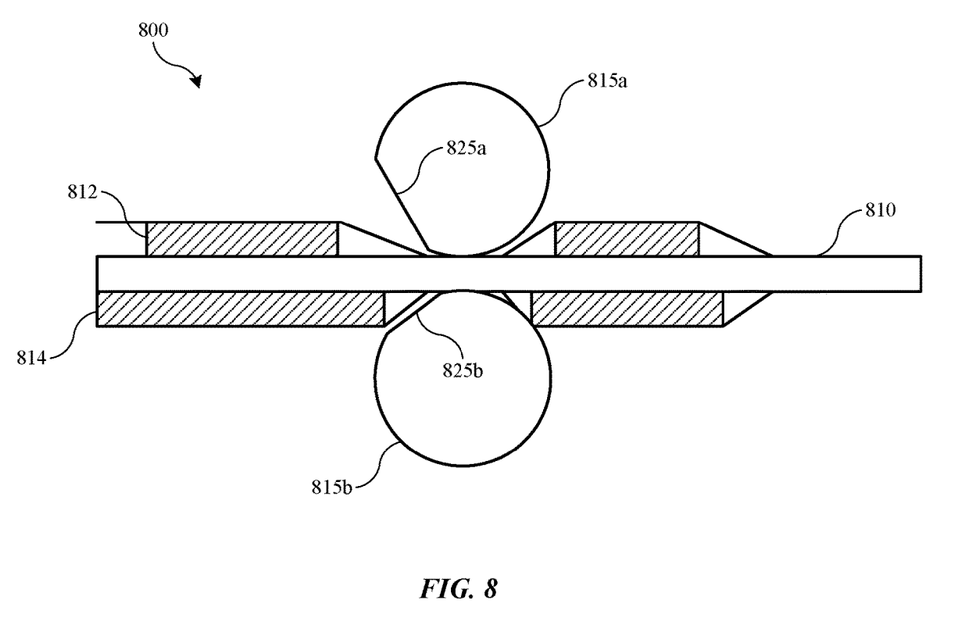
FIG. 8 shows a schematic view of an exemplary lamination system according to some embodiments of the present technology.

FIG. 8 shows a schematic view of an exemplary lamination system 800 according to some embodiments of the present technology. System 800 may include any of the components or characteristics of any of the previous systems, and may reduce leading edge damage on materials of a substrate being compressed within the system 800. System 800 is again illustrated as performing operations on a battery cell substrate, although it is to be understood that the system may be adapted to or utilized with any other manufacturing setup.

System 800 may be similar to system 700, and may illustrate an additional modification, which may be incorporated in some manufacturing operations. For example, in some manufacturing operations, material 812 and material 814 deposited on base 810 may be different materials. In a battery cell, for example, the materials 812, 814 may illustrate cathode and/or anode materials, which may be deposited at different spacings, thicknesses, or overall amounts, depending on characteristics or properties of the materials being deposited. In some exemplary battery cell designs, the anode material may cover a larger volume than the cathode material, and this volume may be accommodated on a greater surface area of the base, such as a separator. For example, material 812 may be a cathode active material, while material 814 may be an anode active material for a batter cell. Because material 814 may extend over a greater length of the base 810, roller 815*b* may be characterized by a different section 825*b* length relative to section 825*a* of roller 815*a*. For example, section 825*a* may be characterized by a greater length than section 825*b*, where the spacing length between sections 814 may be shorter than the spacing length between sections 812.

Figure 9A:
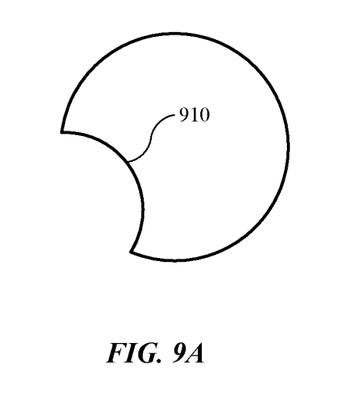
FIGS. 9A-9C show schematic cross-sectional profiles of exemplary pinch rollers according to some embodiments of the present technology.
Figure 9B:
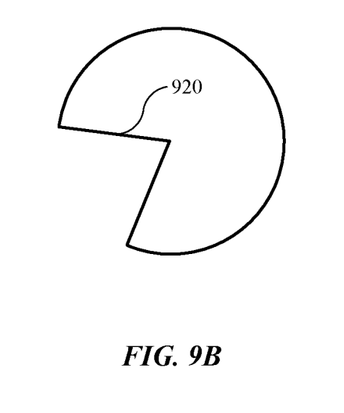
Figure 9C:
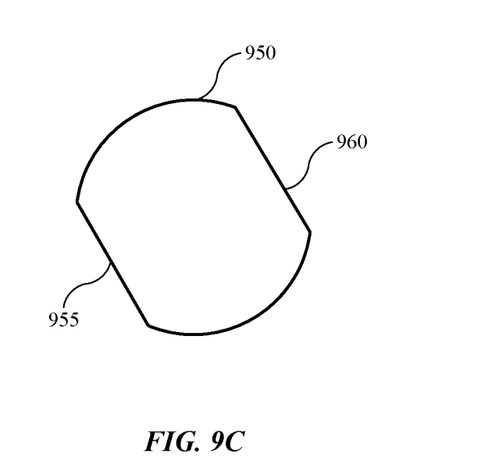

Any number of additional cross-sectional profiles may be formed along a perimeter of exemplary rollers as well. FIGS. 9A-9C show schematic cross-sectional profiles of exemplary pinch rollers according to some embodiments of the present technology. For example, FIG. 9A and FIG. 9B illustrate roller profiles including a concave and notched shape respectively. Concave section 910 and notched section 920 may operate similarly to flat sections 825 described above, and may illustrate examples of any number of variations where a portion of the profile about a perimeter of a roller is not characterized by a convex profile, which may afford a reduction or elimination of a horizontal impact that can lead to leading edge damage. The figures may illustrate schematics, where production rollers may not include any square or sharp corners that may puncture components to be compressed, depending on an impact location of the roller edge during manufacturing operations.

FIG. 9C illustrates an additional example of a roller design where more than one flat or concave section may be incorporated. Roller 950 may include sections 955 and 960 disposed along a perimeter of roller 950. In other embodiments, depending on size of the rollers, length of the materials to be compressed, spacing between components, and other characteristics, rollers may include any number of flat sections spaced and configured to accommodate a leading edge of a segment of material to be compressed. Between sections 955 and 960, and any other flat sections, the roller may be characterized by a constant radius, which may provide uniform contact across a material being compressed. In some embodiments, a distance along the cross-sectional perimeter of the roller may be equal to or greater than a length of a segment of material to be compressed. Accordingly, the portions of the perimeter characterized by a constant radius may ensure an entire segment is compressed or laminated uniformly. Although shown with flats, roller 950 may include any of the other roller profiles discussed previously for any or all of the sections 955, 960, or additional sections about the roller. By using any of the exemplary designs described, either alone or in any combination as described, leading edge damage in a compression or lamination process may be reduced or eliminated providing increased yield, and less damage to constituent components on a substrate.

In the preceding description, for the purposes of explanation, numerous details have been set forth in order to provide an understanding of various embodiments of the present technology. It will be apparent to one skilled in the art, however, that certain embodiments may be practiced without some of these details, or with additional details.

Having disclosed several embodiments, it will be recognized by those of skill in the art that various modifications, alternative constructions, and equivalents may be used without departing from the spirit of the embodiments. Additionally, a number of well-known processes and elements have not been described in order to avoid unnecessarily obscuring the present technology. Accordingly, the above description should not be taken as limiting the scope of the technology.

Where a range of values is provided, it is understood that each intervening value, to the smallest fraction of the unit of the lower limit, unless the context clearly dictates otherwise, between the upper and lower limits of that range is also specifically disclosed. Any narrower range between any stated values or unstated intervening values in a stated range and any other stated or intervening value in that stated range is encompassed. The upper and lower limits of those smaller ranges may independently be included or excluded in the range, and each range where either, neither, or both limits are included in the smaller ranges is also encompassed within the technology, subject to any specifically excluded limit in the stated range. Where the stated range includes one or both of the limits, ranges excluding either or both of those included limits are also included. Where multiple values are provided in a list, any range encompassing or based on any of those values is similarly specifically disclosed.

As used herein and in the appended claims, the singular forms "a", "an", and "the" include plural references unless the context clearly dictates otherwise. Thus, for example, reference to "a material" includes a plurality of such materials, and reference to "the cell" includes reference to one or more cells and equivalents thereof known to those skilled in the art, and so forth.

Also, the words "comprise(s)", "comprising", "contain(s)", "containing", "include(s)", and "including", when used in this specification and in the following claims, are intended to specify the presence of stated features, integers, components, or operations, but they do not preclude the presence or addition of one or more other features, integers, components, operations, acts, or groups.

What is claimed is:

1. A method of laminating a multilayer substrate, the method comprising:
    providing the multilayer substrate comprising a base in a feed direction through a laminating system, wherein the base supports segments of a material, each segment characterized by a height past the base in a direction normal to the feed direction, each segment characterized by a first surface in contact with the base, a second surface opposite the first surface, and a third surface extending between the first surface and the second surface at a front of each segment in the feed direction, wherein each segment defines a leading edge at an intersection of the second surface and the third surface, and wherein the segments are separated from one another along the base by a spacing length;
    contacting a first segment with a set of pinch rollers, wherein the contacting limits interaction with the third surface of the first segment at the leading edge of the first segment; and
    compressing the first segment against the base in a direction normal to the feed direction.

2. The method of laminating the multilayer substrate of claim 1, wherein the set of pinch rollers comprise two pinch rollers, each pinch roller rotatable in the feed direction at a position adjacent the multilayer substrate, wherein the two pinch rollers are separated by a gap distance defined at a contact position with the multilayer substrate at a location within the spacing length between two segments of the material and at a minimum separation between the two pinch rollers during revolution within the spacing length.

3. The method of laminating the multilayer substrate of claim 2, wherein the gap distance is substantially equal to a thickness of the multilayer substrate through a segment location less a compression distance.

4. The method of laminating the multilayer substrate of claim 2, wherein a diameter of the pinch rollers produce a tangent angle of less than 90°.

5. The method of laminating the multilayer substrate of claim 2, wherein one of the two pinch rollers is coupled with a lifter configured to increase the gap distance proximate each segment to a gap distance substantially equal to a thickness of the multilayer substrate through a segment location less a compression distance.

6. The method of laminating the multilayer substrate of claim 2, wherein at least one pinch roller of the two pinch rollers defines a section along a cross-sectional perimeter of the pinch roller characterized by a substantially linear or concave profile.

7. The method of laminating the multilayer substrate of claim 6, wherein the at least one pinch roller of the two pinch rollers is characterized by a constant radius along the remaining perimeter of the pinch roller.

8. The method of laminating the multilayer substrate of claim 6, wherein the at least one pinch roller defines a plurality of sections along the cross-sectional perimeter.

9. The method of laminating the multilayer substrate of claim 8, wherein the at least one pinch roller is characterized by a constant radius between each section of the plurality of the sections, and wherein a distance along the cross-sectional perimeter between each section is greater than a length of each segment of the material.

10. The method of laminating the multilayer substrate of claim 6, wherein each of the two pinch rollers defines a section along the cross-sectional perimeter of the pinch roller characterized by the substantially linear or concave profile.

11. The method of laminating the multilayer substrate of claim 10, wherein the section on a first pinch roller of the two pinch rollers is characterized by a greater length than the section on a second pinch roller of the two pinch rollers.

12. The method of laminating the multilayer substrate of claim 2, wherein each pinch roller comprises steel.

13. A method of laminating a multilayer substrate, the method comprising:
    providing the multilayer substrate comprising a base in a feed direction through a laminating system, wherein the base supports segments of material, each segment characterized by a height past the base in a direction normal to the feed direction, each segment characterized by a first surface in contact with the base, a second surface opposite the first surface, and a third surface extending between the first surface and the second surface at a front of each segment in the feed direction, wherein each segment defines a leading edge at an intersection of the second surface and the third surface, and wherein the segments are separated from one another along the base by a spacing length;
    contacting a first segment with a set of pinch rollers, wherein the contacting limits interaction with the third surface of the first segment at the leading edge of the first segment, wherein at least one pinch roller of the set of pinch rollers defines a section along a cross-sectional perimeter of the pinch roller characterized by a substantially linear or concave profile, and wherein one pinch roller of the set of pinch rollers is characterized by a larger diameter than another pinch roller of the set of pinch rollers, the larger diameter of the pinch roller configured to produce a tangent angle of less than 90°; and
    compressing the first segment against the base in a direction normal to the feed direction.

* * * * *